(12) United States Patent
Chen et al.

(10) Patent No.: US 7,182,485 B2
(45) Date of Patent: Feb. 27, 2007

(54) COOLING AIR GATHERING PLATE

(75) Inventors: Ying-Chieh Chen, Miaoli County (TW); Cheng Wang, Miaoli County (TW); Sen-Ming Hsu, Miaoli County (TW); Tsung-Ching Lin, Miaoli County (TW)

(73) Assignee: Coretronic Corporation, Miaoli County (TW)

( * ) Notice: Subject to any disclaimer, the term of this patent is extended or adjusted under 35 U.S.C. 154(b) by 83 days.

(21) Appl. No.: 11/008,277

(22) Filed: Dec. 10, 2004

(65) Prior Publication Data
US 2006/0061995 A1   Mar. 23, 2006

(30) Foreign Application Priority Data
Sep. 21, 2004   (TW) .............................. 93128619 A

(51) Int. Cl.
    *F21V 7/20*   (2006.01)
(52) U.S. Cl. .................. 362/345; 362/373; 362/294; 362/547; 313/22; 313/24; 313/36
(58) Field of Classification Search ................ 362/516, 362/547, 263–264, 296, 345, 373, 294, 255–256; 313/113, 24, 13, 36, 22
See application file for complete search history.

(56) References Cited

U.S. PATENT DOCUMENTS

| 1,950,918 A | * | 3/1934 | Forbes ....................... 362/300 |
| 5,174,646 A | * | 12/1992 | Siminovitch et al. ....... 362/218 |
| 2004/0202005 A1 | * | 10/2004 | Moisel ....................... 362/538 |

* cited by examiner

*Primary Examiner*—Renee Luebke
*Assistant Examiner*—Robert May
(74) *Attorney, Agent, or Firm*—Rosenberg, Klein & Lee

(57) ABSTRACT

A cooling air gathering plate for enhancing a cooling effect of a projector lamp is disclosed. The gathering plate has a notch to collect the cooling air at a lampwick, a welding point of the lamp, and/or any high temperature position of the lamp. A center line of the gathering plate matches together with an axis of the lamp. The gathering plate can be fixed on the lamp, a lamp reflector, or a holder for fixing the gathering plate to guide the cooling air passing through the high temperature position of the lamp.

8 Claims, 6 Drawing Sheets

COOLING AIR GATHERING PLATE

RELATED APPLICATIONS

The present application is based on, and claims priority from, Taiwan Application Serial Number 93128619, filed Sep. 21, 2004, the disclosure of which is hereby incorporated by reference herein in its entirety.

BACKGROUND OF THE INVENTION

1. Field of Invention

The invention relates to a cooling device and, in particular, to a cooling air gathering plate for a projector lamp.

2. Related Art

The cooling means of a conventional projector lamp is to use an air sending device to blow cool air toward the lamp reflector, the lampwick and any high-temperature position in the lamp, thereby taking away the heat of the lamp. As shown in FIG. 1, the high-temperature positions on the projector lamp 500 are the lampwick 510, the welding point 520, and the end point 530. When cooling the projector lamp 500 using the conventional means, the cooling air has a direct impact on the lampwick 510 whereas the welding point 520 and the end point 530 are not within the reach of the cooling air if the lamp reflector is shallow. Therefore, the welding point 520 and the end point 530 are less likely to be cooled. If the lamp reflector is deeper, there is an air current at the bottom of the lamp reflector. The air that absorbs the heat is not easy to exchange with the cool air, resulting in a worse cooling effect on the lampwick 510. However, the welding point 520 and the end point 530 obtain better cooling. As described above, the cooling effects on the parts of the projector lamp are different, or at least each part is not cooled appropriately according to their temperatures. Thus, the performance and lifetime of the lamp are sacrificed. If one uses a high-power projector, one has to use a larger air sending device or one with a higher rotation speed in order to enhance the cooling correspondingly. However, the larger air sending device occupies a larger space whereas the high-speed air sending device usually come with unbearable noises.

SUMMARY OF THE INVENTION

An objective of the invention is to provide a cooling air gathering plate for a projector lamp to collect and guide cooling air inside the lamp reflector to high-temperature points on the projector lamp, effectively using the cooling air to enhance the cooling effect. Since the cooling air is fully utilized, the system noise can be reduced.

To achieve the above objective, the cooling air gathering plate has a notch. The center line of the cooling air gathering plate matches with an axis of the lamp. From the front of the lamp reflector, the gathering plate and the flowing direction of the cooling air subtend an angle. The notch is formed on the gathering plate to accommodate high-temperature points, such as the lampwick, the welding point, and the end point, of the projector lamp. The gathering plate can be fixed on the lamp reflector, the projector lamp, or a holder for fixing the gathering plate to guide the cooling air passing through the high temperature position of the lamp.

BRIEF DESCRIPTION OF THE DRAWINGS

These and other features, aspects and advantages of the invention will become apparent by reference to the following description and accompanying drawings which are given by way of illustration only, and thus are not limitative of the invention, and wherein.

DETAILED DESCRIPTION OF THE PREFERRED EMBODIMENT

The present invention will be apparent from the following detailed description, which proceeds with reference to the accompanying drawings, wherein the same references relate to the same elements.

Figure 1:
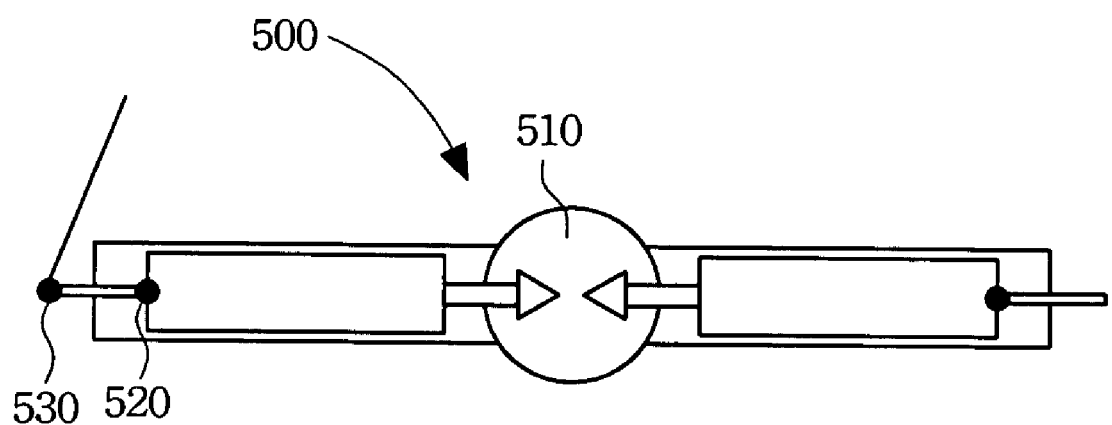
FIG. 1 is a schematic exploded view of a part of the projector lamp.
Figure 2:
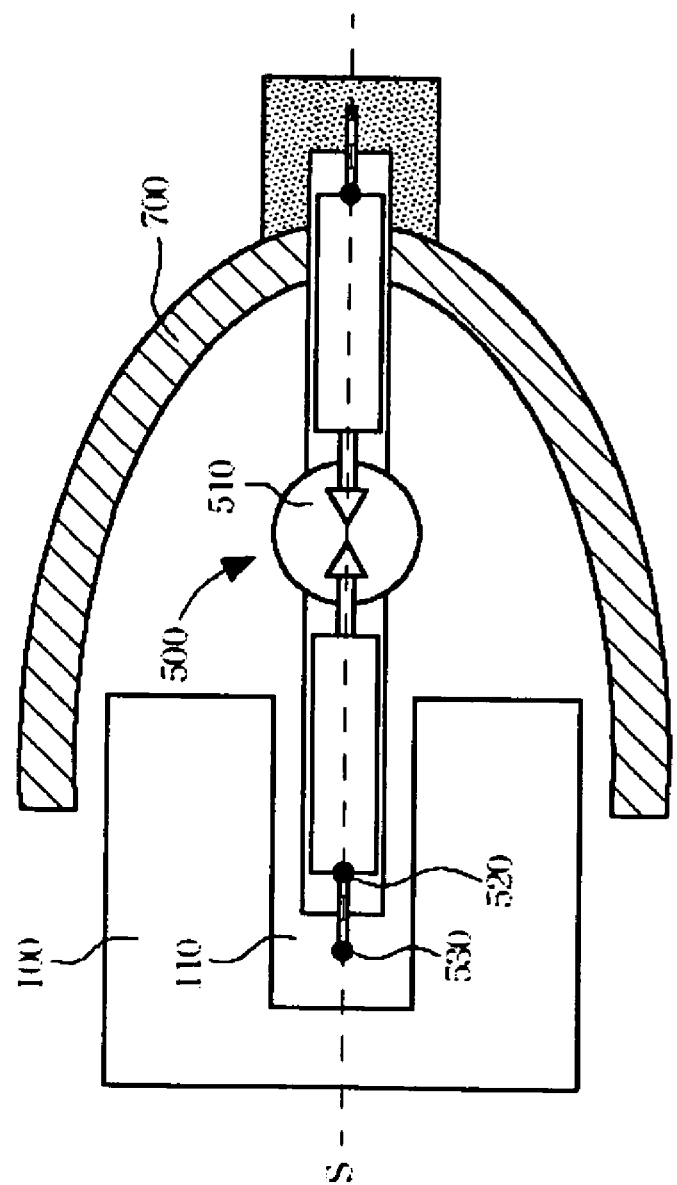
FIG. 2 is a schematic side view of the projector lamp module installed with a gathering plate according to a preferred embodiment of the invention.
Figure 3:
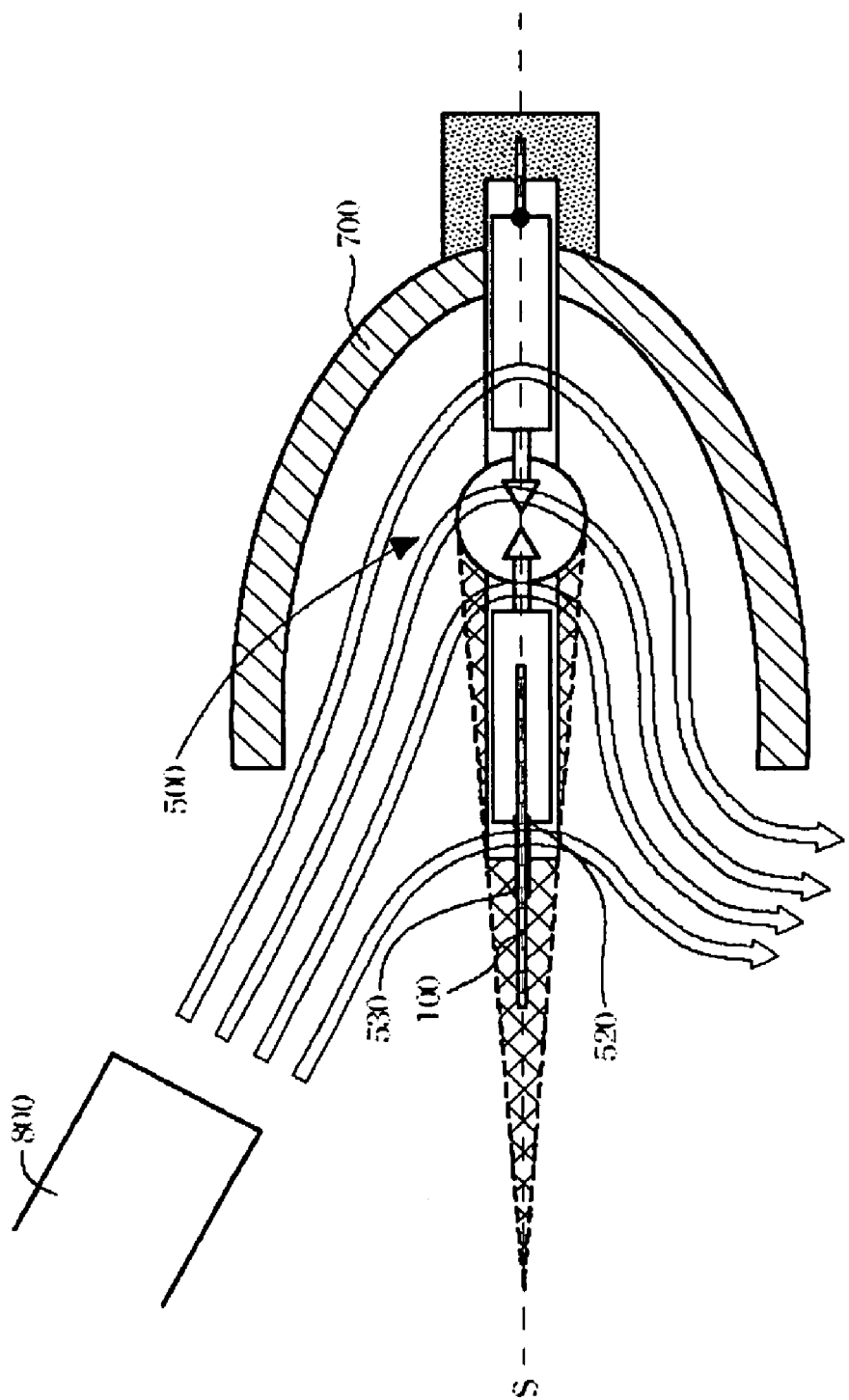
FIG. 3 is a schematic top view of the cooling air flow inside the projector lamp module of FIG. 2.
Figure 4:
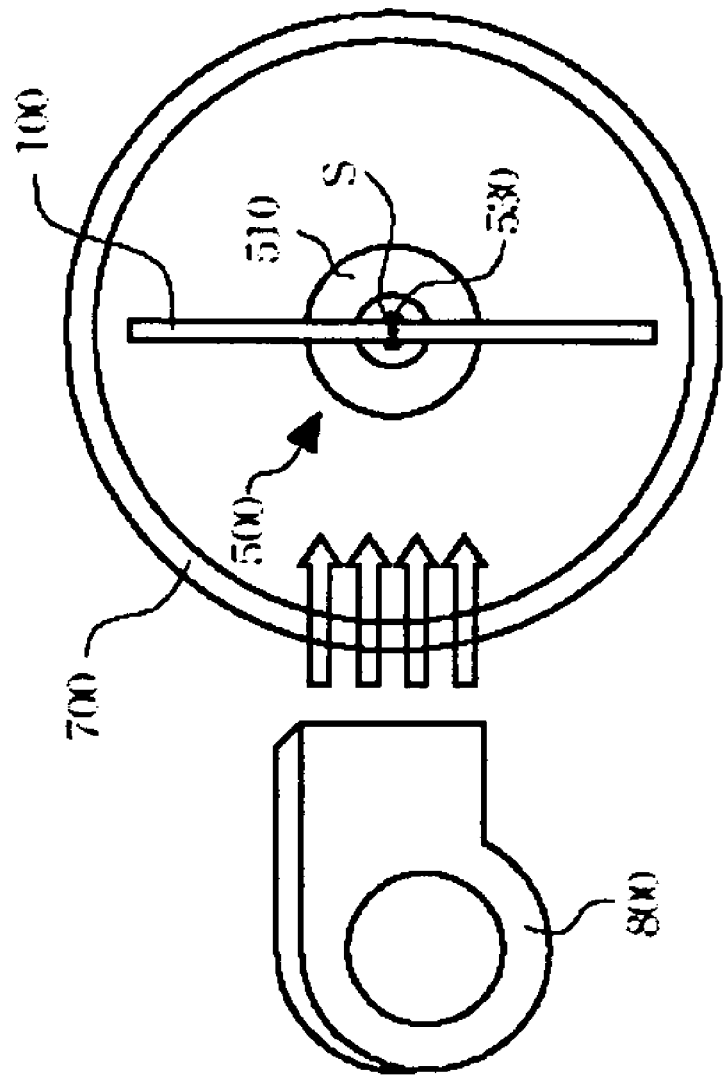
FIG. 4 is a schematic view from the front of the lamp reflector of the projector lamp module of FIG. 2.

As shown in FIGS. 2, 3, and 4, the disclosed cooling air gathering plate 100 for a projector lamp has a notch 110. The center line of the cooling air gathering plate 100 matches with an axis S of the lamp 500. From the front of the lamp reflector 700, the gathering plate and the flowing direction of the cooling air subtends an angle, which is between 0 and 180 degrees. The subtended angle is preferably 90 degrees.

The notch 110 is on the gathering plate 100 to accommodate the lampwick 510, the welding point 520, and the end point 530 of the projector lamp 500.

As shown in FIG. 3, the cooling air blown into the lamp reflector 700 is guided by the gathering plate 100 to flow toward the notch 110. It passes by the high-temperature points on the lampwick 510, the welding point 520, and the end point 530 of the projector lamp 500, taking away heat thereon. Due to the installation of the gathering plate 100, most cooling air flows to the high-temperature points to enhance the cooling effect on the projector lamp 500.

From the top view of FIG. 3, the gathering plate 100 is located on the plane of the axis S of the projector lamp 500. Therefore, it has less influence on the brightness of the light source.

Figure 5:
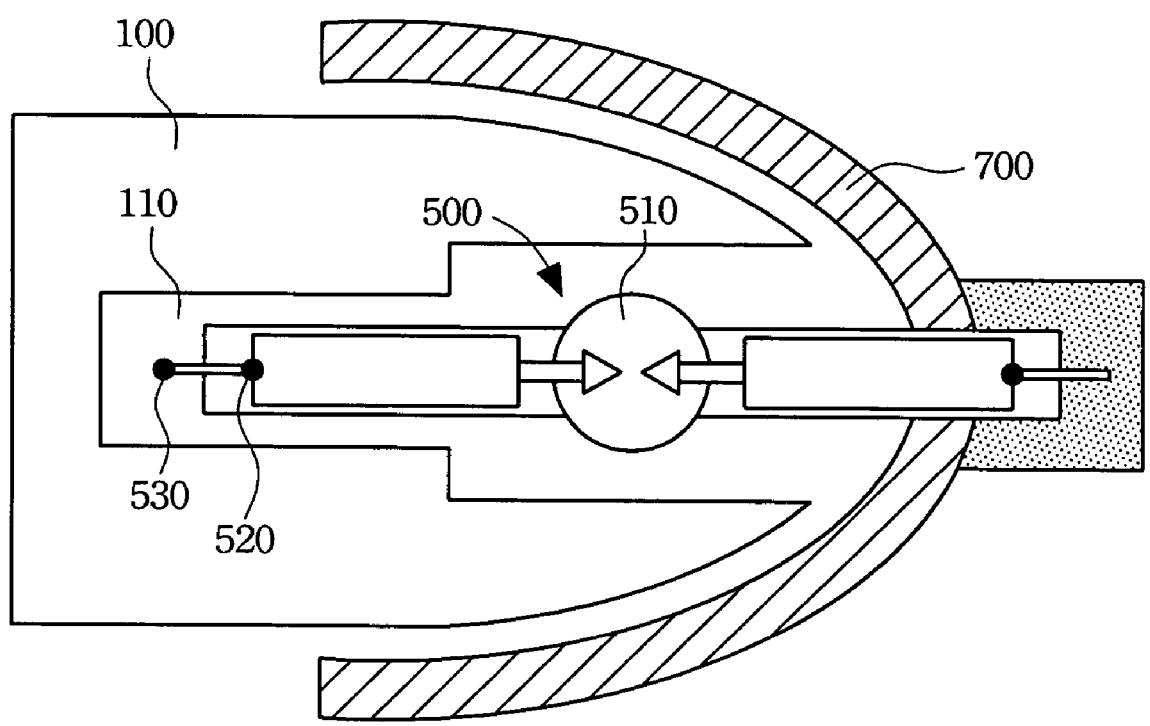
FIG. 5 is a schematic side view of the projector lamp module installed with a gathering plate according to another embodiment of the invention.
Figure 6A:
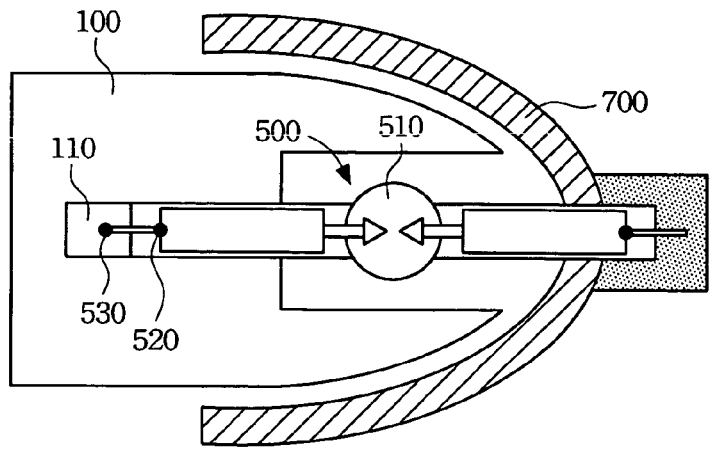
FIG. 6A is a schematic side view of fixing the gathering plate on the projector lamp.
Figure 6B:
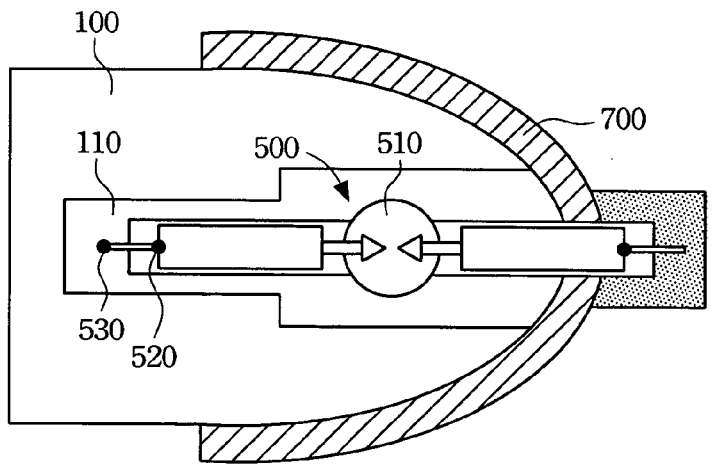
FIG. 6B is a schematic side view of fixing the gathering plate on the lamp reflector.
Figure 6C:
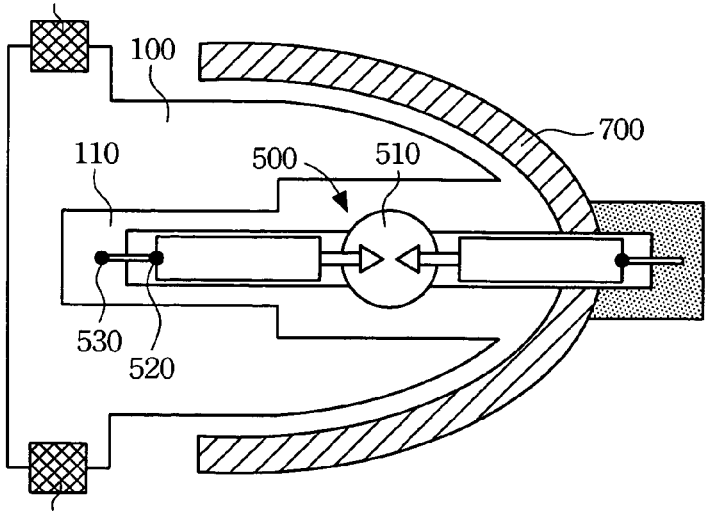
FIG. 6C is a schematic side view of fixing the gathering plate on a holder.

All kinds of variations can be done within the scope of the invention. For example, the shape of the gathering plate 100 is not restricted to the one in FIG. 2. As shown in FIG. 5, the gathering plate 100 further extends to the bottom of the lamp reflector 700, forcing most cooling air to flow toward the only notch 110. Alternatively, notches 110 of different shapes can be made to satisfy different heat dissipation needs at different parts of the projector lamp. The gathering plate 100 can be fixed, as shown in FIGS. 6A, 6B, and 6C, on the lamp 500 or the lamp reflector 700. The gathering plate 100 can be installed on a holder 710 outside the lamp 500 and the lamp reflector 700. The material of the gathering plate 100 can ensure high temperatures. It can have less influence on the brightness of the light source if made of a transparent material. All such modifications should be considered as part of the invention.

From the preferred embodiment described above, we know the invention has the following advantages:

The gathering plate guides cooling air toward the notch, which accommodates the lampwick, the welding point, and the end point of the projector lamp, taking away heat thereon. Since most of the cooling air flows by high-temperature points, its cooling effect is greatly enhanced.

The gathering plate is a thin sheet and rests on the plane of the axis of the lamp. Therefore, it has little effect on the brightness of the light source.

The cooling effect can be enhanced without increasing the volume of the system or the rotational speed of the air sending device.

While the invention has been described by way of example and in terms of the preferred embodiment, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A projector lamp module, comprising:
a lamp reflector;
a projector lamp inside the lamp reflector,
a gathering plate, being installed inside the lamp reflector and located on a plane of an axis of the lamp, wherein when viewing from a front side of the lamp reflector, the gathering plate and a flowing direction of a cooling air form an angle between 0 and 180 degrees; and
a notch, being formed on the gathering plate to accommodate the lamp.

2. The projector lamp module of claim 1, wherein the projector lamp has at least a high-temperature point and the notch covers the high-temperature point.

3. The projector lamp module of claim 1, wherein the gathering plate is fixed on the projector lamp.

4. The projector lamp module of claim 1, wherein the gathering plate is fixed on the lamp reflector.

5. The projector lamp module of claim 1, wherein the gathering plate contains a holder to fix the gathering plate.

6. The projector lamp module of claim 1, wherein the gathering plate includes a transparent material.

7. The projector lamp module of claim 1, wherein the gathering plate includes a metal.

8. The projector lamp module of claim 1, wherein the gathering plate includes a non-metal material.

* * * * *